US010789301B1

(12) United States Patent
Balakrishnan et al.

(10) Patent No.: US 10,789,301 B1
(45) Date of Patent: Sep. 29, 2020

(54) METHOD, APPARATUS, AND COMPUTER PROGRAM PRODUCT FOR INFERRING DEVICE RENDERED OBJECT INTERACTION BEHAVIOR

(71) Applicant: Groupon, Inc., Chicago, IL (US)

(72) Inventors: Raju Balakrishnan, Santa Clara, CA (US); Abhaya Parthy, Palo Alto, CA (US); Sunil Ramnik Raiyani, Palo Alto, CA (US); Emma Sawin, Palo Alto, CA (US); Changjian Zou, Palo Alto, CA (US)

(73) Assignee: Groupon, Inc., Chicago, IL (US)

( * ) Notice: Subject to any disclaimer, the term of this patent is extended or adjusted under 35 U.S.C. 154(b) by 145 days.

(21) Appl. No.: 16/033,928

(22) Filed: Jul. 12, 2018

Related U.S. Application Data

(60) Provisional application No. 62/531,766, filed on Jul. 12, 2017.

(51) Int. Cl.
| | | |
|---|---|---|
| *G06F 15/16* | (2006.01) | |
| *G06F 16/903* | (2019.01) | |
| *G06N 5/04* | (2006.01) | |
| *G06N 20/00* | (2019.01) | |
| *H04L 29/06* | (2006.01) | |
| *H04L 29/08* | (2006.01) | |

(52) U.S. Cl.
CPC ......... *G06F 16/90335* (2019.01); *G06N 5/04* (2013.01); *G06N 20/00* (2019.01); *H04L 29/06* (2013.01); *H04L 29/08072* (2013.01); *H04L 67/306* (2013.01); *H04L 67/42* (2013.01)

(58) Field of Classification Search
CPC . H04L 67/306; H04L 67/42; H04L 29/08576; H04L 29/06; H04L 29/08072; G06F 16/90335; G06N 20/00; G06N 5/04
See application file for complete search history.

(56) References Cited

U.S. PATENT DOCUMENTS

| | | | | |
|---|---|---|---|---|
| 2003/0028622 A1* | 2/2003 | Inoue | ...................... | H04L 63/10 709/219 |
| 2007/0168417 A1* | 7/2007 | Swanburg | ............... | H04L 65/40 709/203 |
| 2009/0144408 A1* | 6/2009 | Wilf | ..................... | H04L 61/2589 709/224 |
| 2011/0276396 A1* | 11/2011 | Rathod | .................. | G06Q 10/00 705/14.49 |

(Continued)

*Primary Examiner* — Razu A Miah
(74) *Attorney, Agent, or Firm* — Alston & Bird LLP

(57) ABSTRACT

The present disclosure relates to inferring device rendered object interaction behavior. An apparatus is configured to receive historical device rendered object interaction data associated with a client device. The historical device rendered object interaction data includes a plurality of records. Each record is associated with an device rendered object category. For each record, the device rendered object category is extracted. For each device rendered object category, a penalty value is generated. The penalty value is a programmatically generated predicted network time delay during which device rendered objects associated with the device rendered object category are not to be transmitted to the client device. A penalty decision, used to determine whether to apply the penalty value to future transmissions of device rendered objects to the client device, is generated.

17 Claims, 4 Drawing Sheets

(56) References Cited

U.S. PATENT DOCUMENTS

| | | | |
|---|---|---|---|
| 2012/0054325 A1* | 3/2012 | Backa | G06F 3/067 709/223 |
| 2012/0084364 A1* | 4/2012 | Sivavakeesar | H04W 4/60 709/205 |
| 2012/0124218 A1* | 5/2012 | Nakamura | H04L 29/08108 709/227 |
| 2012/0240185 A1* | 9/2012 | Kapoor | H04L 63/1425 726/1 |
| 2012/0246243 A1* | 9/2012 | Nagamine | H04L 29/06 709/206 |
| 2012/0317194 A1* | 12/2012 | Tian | H04W 8/005 709/204 |
| 2014/0113600 A1* | 4/2014 | El Gamal | H04W 28/16 455/414.3 |
| 2014/0344013 A1* | 11/2014 | Karty | G06Q 30/0201 705/7.29 |
| 2015/0081434 A1* | 3/2015 | Frangakis | G06Q 30/0255 705/14.53 |
| 2015/0170105 A1* | 6/2015 | Lim | G06Q 10/06 705/7.19 |
| 2015/0278962 A1* | 10/2015 | Agarwal | G06Q 30/0244 705/7.39 |
| 2016/0267547 A1* | 9/2016 | Umeno | G06Q 10/04 |
| 2016/0335550 A1* | 11/2016 | Achin | G06N 5/02 |
| 2016/0379243 A1* | 12/2016 | Kalish | G06N 20/00 705/14.41 |
| 2017/0147722 A1* | 5/2017 | Greenwood | G06F 30/20 |
| 2017/0169336 A1* | 6/2017 | Singhal | G06F 16/9024 |

* cited by examiner

METHOD, APPARATUS, AND COMPUTER PROGRAM PRODUCT FOR INFERRING DEVICE RENDERED OBJECT INTERACTION BEHAVIOR

The present application claims priority to U.S. Provisional Patent Application Ser. No. 62/531,766, titled "METHOD, APPARATUS, AND COMPUTER PROGRAM PRODUCT FOR INFERRING DEVICE RENDERED OBJECT INTERACTION BEHAVIOR," filed Jul. 12, 2017, the contents of which are incorporated herein by reference in their entirety.

BACKGROUND

A client device may interact with a received device rendered object, where the device rendered object has a category associated therewith. The client device may, subsequently, interact with a different device rendered object having the same or a different category associated therewith. Through applied effort, ingenuity, and innovation, many of these identified problems have been solved by developing solutions that are included in embodiments of the present disclosure, many examples of which are described in detail herein.

BRIEF SUMMARY

This specification relates to inferring device rendered object interaction behavior. In one embodiment, a computing entity or apparatus is configured to receive historical device rendered object interaction data associated with a client device. In embodiments, the historical device rendered object interaction data comprising a plurality of records. In embodiments, each record of the historical device rendered object interaction data is associated with an device rendered object category.

In embodiments, the apparatus is further configured to, for each record of the historical device rendered object interaction data, extract the device rendered object category.

In embodiments, the apparatus is further configured to, for each device rendered object category, generate a penalty value, where the penalty value is a programmatically generated predicted network time delay during which device rendered objects associated with the device rendered object category are not to be transmitted to the client device.

In embodiments, the apparatus is further configured to generate a penalty decision, where the penalty decision is used to determine whether to apply the penalty value to future transmissions of device rendered objects to the client device.

Other embodiments include corresponding systems, methods, and computer programs, configured to perform the operations of the apparatus, encoded on computer storage devices. These and other embodiments can each optionally include one or more of the following features.

In embodiments, the apparatus is further configured to retrieve a plurality of device rendered objects selected for transmission to the client device.

In embodiments, the apparatus is further configured to rank the plurality of device rendered objects according to a ranking algorithm.

In embodiments, the apparatus is further configured to, for each device rendered object of the plurality of device rendered objects, retrieve a penalty decision associated with an device rendered object category of the device rendered object.

In embodiments, the apparatus is further configured to, in the event the penalty decision indicates that the penalty value should be applied, apply the penalty value to a ranking value of the device rendered object, and re-rank the plurality of device rendered objects.

In embodiments, the apparatus is further configured to transmit the ranked plurality of device rendered objects to the client device. In embodiments, the plurality of device rendered objects is arranged for display according to the ranking values of each device rendered object.

In some embodiments, the penalty decision is generated using a logistic regression model. In some embodiments, the penalty value is generated using a machine learning model.

In some embodiments, the ranking algorithm assigns a ranking value to each device rendered object of the plurality of device rendered objects based on one or more of user activities (such as purchases and clicks), object attributes (such as price and category), user specific attributes (such as gender and age), combined attributes of user and object (such as distance between user and the object).

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Figure 1:
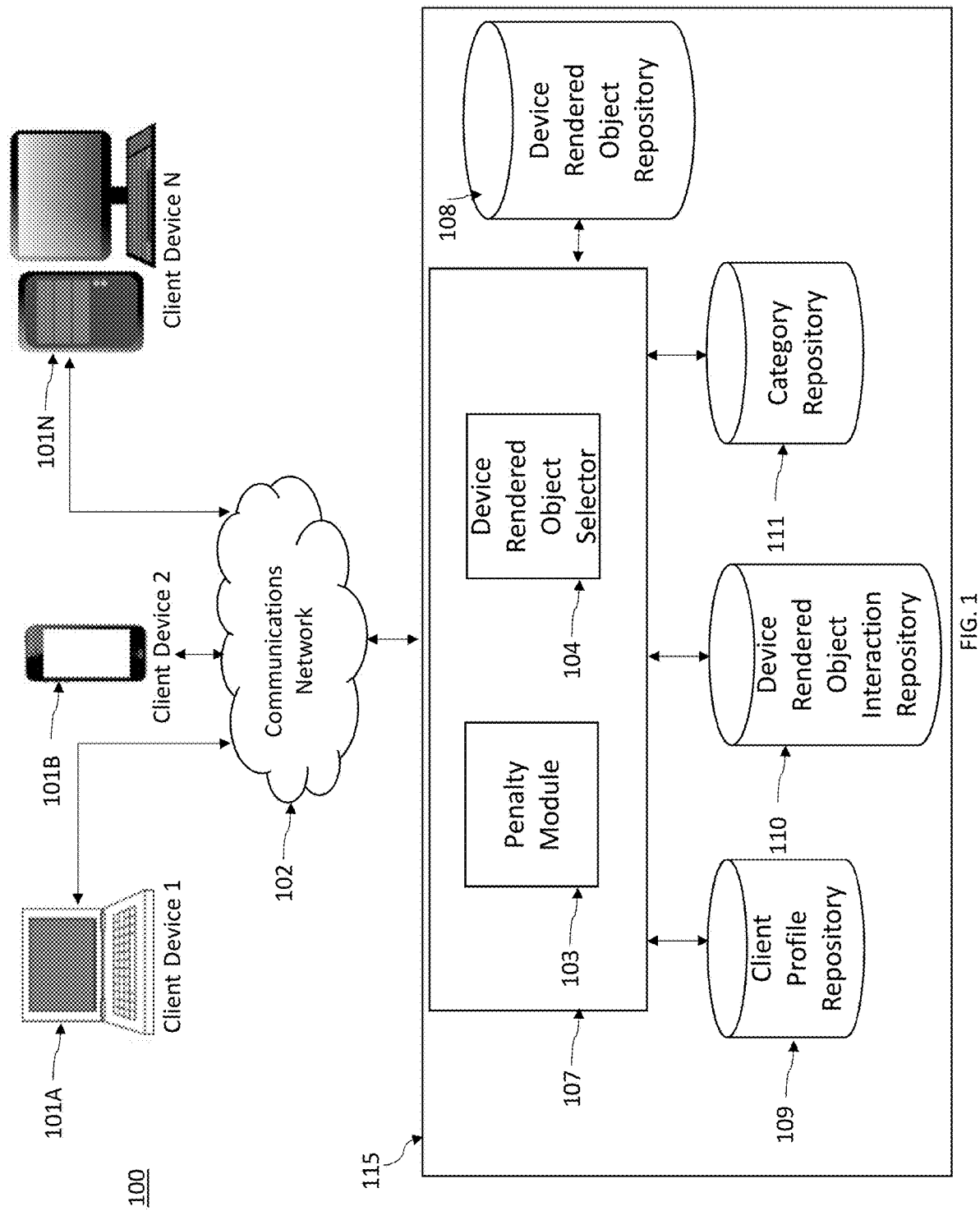
Figure 2:
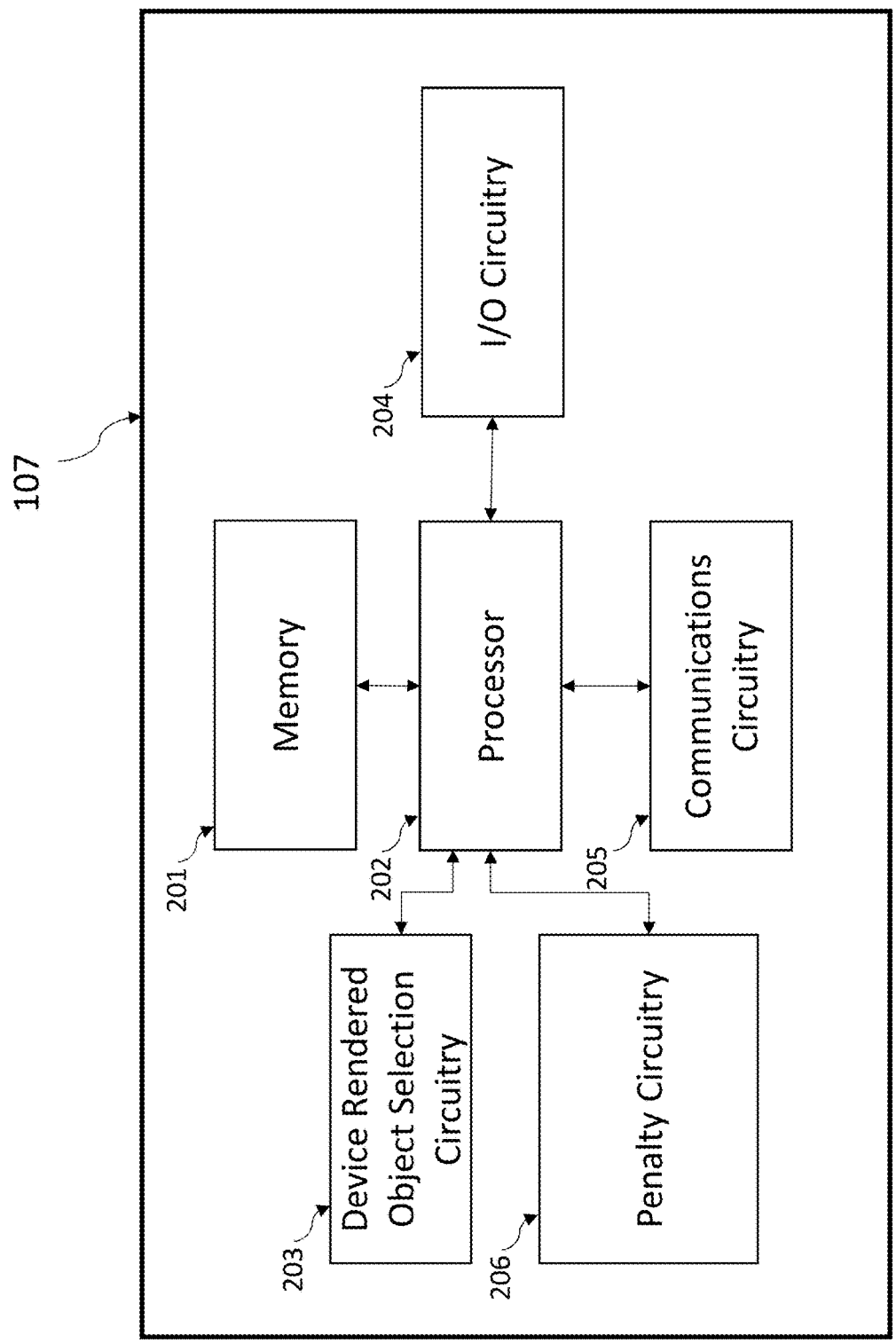
Figure 3:
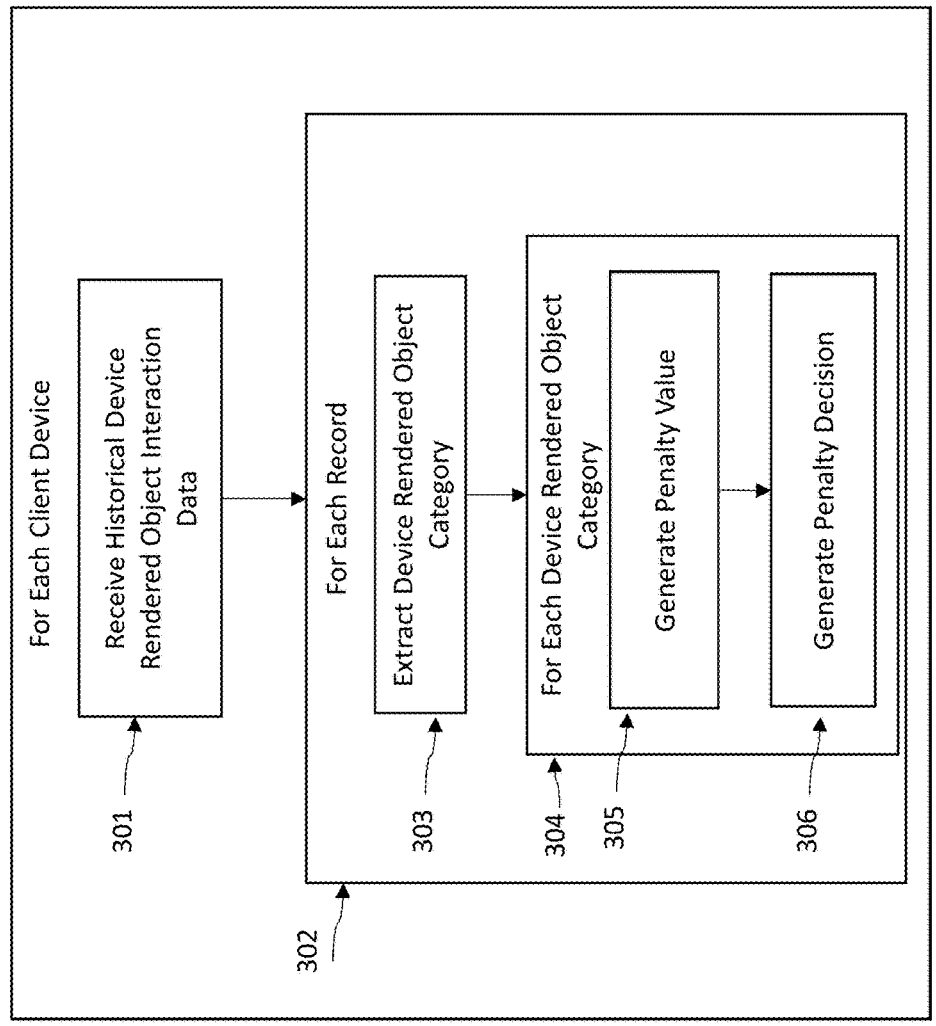
Figure 4:
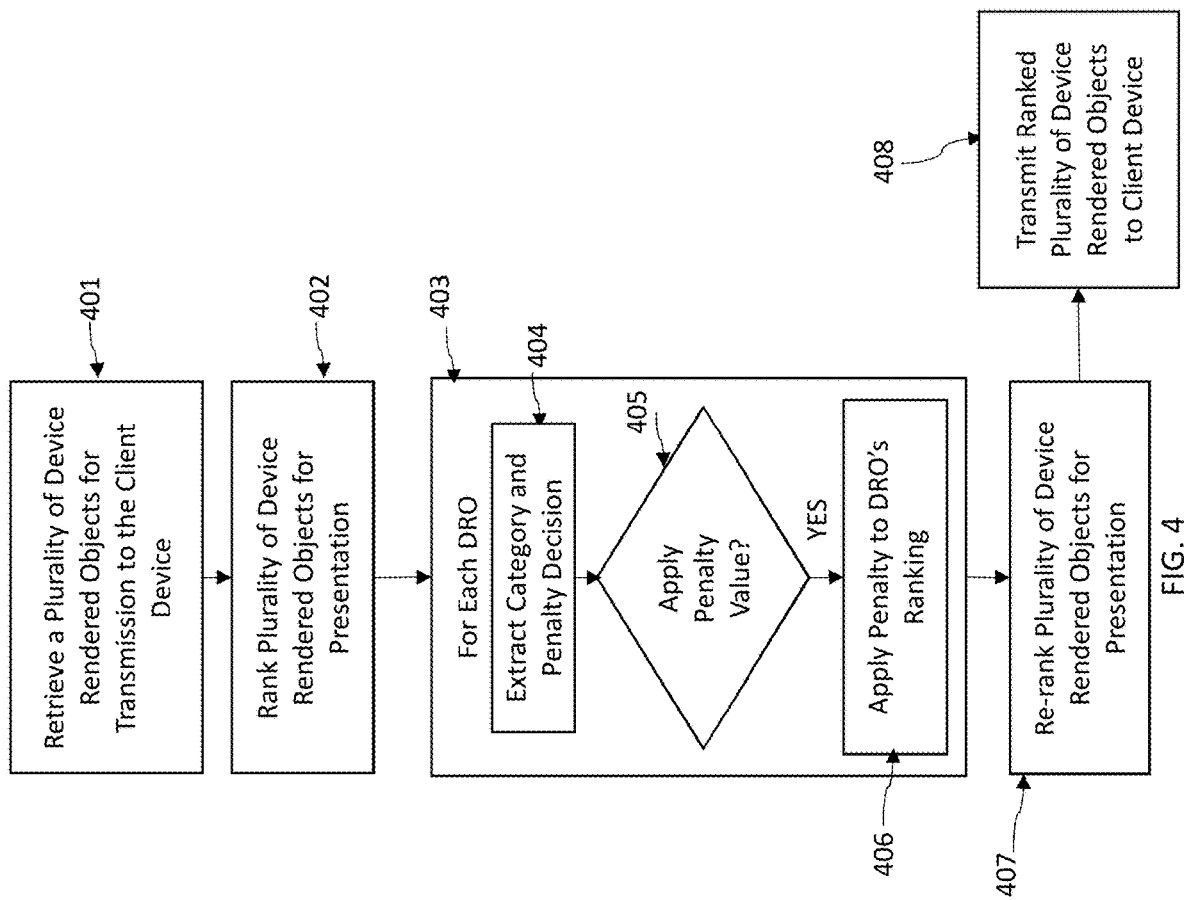

Having thus described the disclosure in general terms, reference will now be made to the accompanying drawings, which are not necessarily drawn to scale, and wherein:

FIG. 1 is a system architecture diagram of a system configured to practice embodiments of the present disclosure;

FIG. 2 is an exemplary schematic diagram of a computing entity according to one embodiment of the present disclosure;

FIG. 3 is an exemplary inference data flow according to one embodiment of the present disclosure; and FIG. 4 is an exemplary device rendered object selection data flow according to one embodiment of the present disclosure.

DETAILED DESCRIPTION OF VARIOUS EMBODIMENTS

Various embodiments of the present disclosure now will be described more fully hereinafter with reference to the accompanying drawings, in which some, but not all embodiments of the disclosure are shown. Indeed, the disclosure may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

Overview

Various embodiments of the disclosure generally relate to inferring device rendered object interaction behavior based on historical device rendered object interaction data associated with a client device. For example, the methods, apparatus and computer program products described herein are operable to receive historical device rendered object interaction data associated with a client device, the historical device rendered object interaction data comprising a plurality of records, wherein each record of the historical device rendered object interaction data is associated with an device rendered object category; for each record of the historical device rendered object interaction data, extract the device rendered object category; for each device rendered object category, generate a penalty value, wherein the penalty value is a programmatically generated predicted network time delay during which device rendered objects associated with the device rendered object category are not to be transmitted to the client device; and generate a penalty decision, wherein the penalty decision is used to determine whether to apply the penalty value to future transmissions of device rendered objects to the client device.

In some examples, a device rendered object system is configured to provide client devices with various device rendered objects. The client devices may interact with the device rendered objects in various ways. A first client device may develop a preference for device rendered objects associated with a first device rendered object category, and prefer that future transmissions of device rendered objects contain device rendered objects associated with the first device rendered object category. A second client device may interact with a device rendered object associated with the first device rendered object category, and prefer that future transmissions of device rendered objects contain device rendered objects that are not associated with the first device rendered object category.

Determining whether a client device is exhibiting and/or will continue to exhibit repeated device rendered object interaction behavior or exploratory device rendered object interaction behavior is computationally intensive. Computationally, a review of historical client device interaction behavior may provide insight into past behavior, however utilizing vast amounts of data to infer or predict whether the client device will continue to exhibit the same behavior becomes resource intensive and exhaustive. Further, incorrect inferences result in an imbalance of inventory of device rendered objects because a client device is less likely to interact with a device rendered object suited to the wrong interaction type. This results in an imbalance of data storage. The inventors have identified that the system resources and time allocated to such behavior determination are easily exhausted and compromised as a result of these challenges. The inventors have determined that the ability to determine inferred device rendered object interaction behavior would reduce the computing resources and time necessary to perform subsequent device rendered object selection. The inventors have further determined that the ability to accurately predict device rendered object interaction behavior reduces computing resources utilized for storage and transmission of device rendered objects suited to the varying interaction types.

Definitions

As used herein, the terms "data," "content," "information," and similar terms may be used interchangeably to refer to data capable of being transmitted, received, and/or stored in accordance with embodiments of the present disclosure. Thus, use of any such terms should not be taken to limit the spirit and scope of embodiments of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

The term "client device" refers to computer hardware and/or software that is configured to access a service made available by a server. The server is often (but not always) on another computer system, in which case the client device accesses the service by way of a network. Client devices may include, without limitation, smart phones, tablet computers, laptop computers, wearables, personal computers, enterprise computers, and the like.

As used herein, the terms "user," "client," "consumer," and "customer" may be used interchangeably to refer, without limitation, to a client, customer, purchaser, shopper, user and the like who may be using a client device to receive and interact with a device rendered object.

The terms "client profile" and "user profile" refer to a collection of preferences, settings, configurations, client device identifiers, data, and information associated with a specific user. A profile refers therefore to the explicit digital representation of a person's identity and other data or information associated with the user. A user profile configured in accordance with the present disclosure is accessible by one or more of the software applications that are supported by the enterprise platform and, thus, may include application-specific preferences, settings, configurations, data, and information. In some embodiments, a user profile can be used to store a description of characteristics of the user and/or of the client device, as well as credentials and preferences of the user.

The term "device rendered object" may be used to refer to a set of executable instructions that, when executed by a processor of a computing device, renders an object for display. An example of a device rendered object can be an instrument of a promotion. The instrument may be any type of gift card, tender, electronic certificate, medium of exchange, voucher, or the like that embodies terms of a promotion from which the instrument resulted and may be used toward at least a portion of the purchase, acquisition, procurement, consumption or the like of goods, services and/or experiences. In some examples, the instrument may take the form of tender that has a given value that is exchangeable for goods, services and/or experiences and/or a reduction in a purchase price of a particular good, service or experience. In some examples, the instrument may have multiple values, such as accepted value, a promotional value, and/or a residual value. In some examples, the accepted value of the instrument is defined by the value exchanged for the instrument. In some examples, the promotional value is defined by the promotion from which the instrument resulted and is the value of the instrument beyond the accepted value. In some examples, the residual value is the value after redemption, the value after the expiration or other violation of a redemption parameter, the return or exchange value of the instrument and/or the like.

In embodiments, each device rendered object has associated data indicating one or more device rendered object categories (such as a restaurant promotion, a spa promotion, a travel promotion, a local promotion, etc.), device rendered object sub-categories (such as a sushi restaurant), location, hyper-locations, prices or the like. For example, an object may be associated with a gym, and the gym may be associated with category data such as "beauty, wellness, and healthcare," "food and drink," "leisure offers and activities" and/or "services." A gym may also have more than one location, and may be able to provide promotions in a variety of price ranges and time frames. The device rendered object may be further associated with sub-category data such as "Chinese food" or "Mexican food."

As used herein, the term "device rendered object system" may include a system that is accessible via one or more computing devices and that is operable to provide device rendered object services on behalf of one or more providers that are offering one or more instruments that are redeemable for goods, services, experiences and/or the like. In some examples, the device rendered object service may take the form of a redemption authority, a payment processor, a rewards provider, an entity in a financial network, a promoter, an agent and/or the like. As such, the device rendered object system is, in some example embodiments, configured to present one or more device rendered objects (e.g., promotions) to client devices, accept payments for device rendered objects from client devices, issue instruments upon acceptance of an object, participate in redemption, generate rewards, provide a point of sale device or service, issue payments to providers and/or otherwise participate in the exchange of goods, services or experiences for currency, value and/or the like.

As used herein, the terms "provider" and "merchant" may be used interchangeably and may include, but are not limited to, a business owner, consigner, shopkeeper, tradesperson, vendor, operator, entrepreneur, agent, dealer, organization or the like that is in the business of providing a good, service or experience to a consumer, facilitating the provision of a good service or experience to a consumer and/or otherwise operating in the stream of commerce. The "provider" or "merchant" need not actually market a product or service via the device rendered object service, as some merchants or providers may utilize the device rendered object service only for the purpose of gathering client profile information, vector activity information, similarity table information, or the like.

The term "device rendered object interaction" refers to electronic interaction with a device rendered object by a client device. In some examples, the device rendered object interaction may take the form of an accessing or selection of the device rendered object, a viewing of the device rendered object on an electronic display, a scrolling over the device rendered object, a retrieval of the device rendered object, a purchase transaction completed for the device rendered object, a redemption transaction completed for the device rendered object, and/or the like.

In some embodiments, "interaction" data may include, including without limitation, mouse-over events and durations, the amount of time spent by the client device viewing particular content, the rate at which impressions of particular content result in sales associated with that content, demographic information associated with each particular client using the client device, data indicating other content accessed by the client device (e.g., browser cookie data), the time or date on which content was accessed, the frequency of impressions for particular content, associations between particular clients or client demographics and particular impressions, a financial transaction performed between the client device and the device rendered object provider/service for a particular device rendered object, a redemption of an instrument represented by the device rendered object, and/or the like.

The term "inferred device rendered object interaction behavior" refers to a inference of what type of behavior a client device is exhibiting based upon past device rendered object interactions. In some examples, the inferred device rendered object interaction behavior may take the form of an exploratory device rendered object behavior or a repeated device rendered object behavior. Exploratory device rendered object behavior, in some embodiments, may mean that a client device prefers to interact with device rendered objects having associated therewith different categories (or different categories over time). Repeated device rendered object interaction behavior, in some embodiments, may mean that a client device prefers to interact with device rendered objects having associated therewith the same or similar categories.

The term "future device rendered object interaction behavior" refers to a prediction as to what type of behavior a client device will exhibit when interacting with a device rendered object at some future network time. In some embodiments, a future device rendered object interaction refers to the very next device rendered object interaction performed by the client device (subsequent all collected historical device rendered object interaction data for the client device).

The term "device rendered object category" refers to a device rendered object category associated with a device rendered object.

The terms "penalty value" and "backoff period" refer to a programmatically generated duration of network time during which device rendered objects associated with the device rendered object category to which the penalty value has been assigned are not to be transmitted to a client device. In some embodiments, the penalty value may be a duration of network time during which device rendered objects associated with the device rendered object category to which the penalty value has been assigned are transmitted to a client device but receive a low ranking so as to not be displayed first (i.e., prominently, at the top of the display, etc.) at the client device. In embodiments, the penalty value may be a number of days, e.g., 5 days. In embodiments, the penalty value is generated using a machine learning model. In embodiments, the penalty value is associated with a programmatically and predictively generated relevance score associated with a device rendered object.

The term "penalty decision" refers to a programmatically generated data value representative of a decision regarding whether to apply a penalty value to a ranking value of a device rendered object. In embodiments, the penalty value is associated with a device rendered object category with which the device rendered object is associated. In embodiments, the penalty decision is generated using a machine learning model.

The term "ranking value" refers to a programmatically generated value assigned to a device rendered object according to a ranking algorithm. In some embodiments, the ranking value is used to arrange a plurality of device rendered objects for display on a client device.

The term "historical device rendered object interaction data" refers to data associated with past device rendered object interactions performed by a client device. In some embodiments, the historical device rendered object interaction data may be limited to a specific number of data fields. In some embodiments, the system may require a minimum number of interactions for historical device rendered object interaction data before an inference based on the historical device rendered object interaction data can be made. In some examples, the historical device rendered object interaction data may take the form of an array, a data structure with a plurality of data fields, a plurality of ordered records and/or the like.

The term "threshold" refers to a value representing a required level of a programmatically expected prediction in order to determine inferred device rendered object interaction behavior.

It should be appreciated that the terms "programmatically expected," "infer," "inferred," or "inference" indicate machine prediction of occurrence of certain events. For example, a "programmatically expected" number of purchases by a first consumer is a number determined by machine prediction specifying the expected number of promotions that will be purchased by the first consumer.

As used herein, the term "likelihood" refers to a measure of probability for occurrence of a particular event. For example, the likelihood that a client device will interact with a device rendered object may be a value associated with a specific scale. In some implementations, the machine predictions discussed above are based, at least in part, on the "likelihood" that an event will occur. Similarly, in some implementations, machine predictions are based on attributes associated with a client profile and/or an associated device rendered object or search query.

The term "electronic correspondence" refers to any form of data transmission in which a device rendered object may be included. For example, an electronic correspondence including one or more device rendered objects may be transmitted to a client device so that the client device may interact with the one or more device rendered objects. It will be appreciated that any form of data can be included in the electronic correspondence.

In certain example instances, preferences or inferred device rendered object interaction behavior associated with a client profile may indicate that future electronic correspondence transmissions of device rendered objects to the client device should not share a device rendered object category with that of a previous device rendered object interaction performed by the client device.

Alternatively, preferences or inferred device rendered object interaction behavior associated with a client profile may indicate that future electronic correspondence transmissions of device rendered objects to the client device should share a device rendered object category with that of a previous device rendered object interaction performed by the client device.

It should be appreciated that the term "subset" describes a proper subset. A proper subset of set is portion of the set that is not equal to the set. For example, if elements A, B, and C belong to a first set, a subset including elements A and B is a proper subset of the first set. However, a subset including elements A, B, and C is not a proper subset of the first set.

Example System Architecture

Methods, apparatuses, and computer program products of the present disclosure may be embodied by any of a variety of devices. For example, the method, apparatus, and computer program product of an example embodiment may be embodied by a networked device, such as a server or other network entity, configured to communicate with one or more devices, such as one or more client devices. Additionally or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

FIG. 1 illustrates an example computing system 100 within which embodiments of the present disclosure may operate. Users may access a device rendered object system 115 via a communications network 104 (e.g., the Internet, LAN, WAN, or the like) using client devices 101A-101N. The device rendered object system 115 may comprise a server 107 in communication with one or more databases or repositories 108, 109, 110, 111.

The server 107 may be embodied as a computer or computers as known in the art. The server 107 may provide for receiving of electronic data from various sources, including but not necessarily limited to the client devices 101A-101N.

The databases or repositories 108-111 may be embodied as a data storage device such as a Network Attached Storage (NAS) device or devices, or as a separate database server or servers. The databases 108-111 include information accessed and stored by the server 107 to facilitate the operations of the device rendered object system 115. For example, the databases 108-111 may include, without limitation, client profiles for users of the system 115, device rendered object interaction data, categories, device rendered objects, and/or the like.

Device rendered object interaction repository 110 may include historical device rendered object interaction data. Client profile repository 109 may include a client profile for each user of the system 115. A client profile may be created upon initial registration or interaction by a client device with the system 115.

Device rendered object repository 108 may include one or more device rendered objects for transmission to client devices 101A-101N.

Category repository 111 may include categories and mappings between device rendered objects and device rendered object categories.

The server 107 may comprise a penalty module 103 that is configured to classify historical and predict future device rendered object behavior according to the description herein. The server 107 may further comprise a device rendered object selector 104 that is configured to select device rendered objects for transmission to a client device according to the description herein.

The client devices 101A-101N may be any computing device as defined above. Electronic data received by the server 107 from the client devices 101A-101N may be provided in various forms and via various methods. For example, the client devices 101A-101N may include desktop computers, laptop computers, smartphones, netbooks, tablet computers, wearables, and the like.

In embodiments where a client device 101A-101N is a mobile device, such as a smart phone or tablet, the client device 101A-101N may execute an "app" to interact with the system 115. Such apps are typically designed to execute on mobile devices, such as tablets or smartphones. For example, an app may be provided that executes on mobile device operating systems such as iOS®, Android®, or Windows®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications. Communication with hardware and software modules executing outside of the app is typically provided via application programming interfaces (APIs) provided by the mobile device operating system.

Additionally or alternatively, the client device 101A-101N may interact with the system 115 via a web browser. As yet another example, the client device 101A-101N may include various hardware or firmware designed to interface with the system 115.

Examples of data flow for exchanging electronic information among one or more client devices 101A-101N and the system 115 are described below.

It will be appreciated that repositories 108-111 may be one or more repositories, and may be part of or separate from server 107.

Example Apparatus for Implementing Embodiments of the Present Disclosure

The server 107 may be embodied by one or more computing systems, such as apparatus 200 shown in FIG. 2. The apparatus 200 may include a processor 202, a memory 201, input/output circuitry 204, communications circuitry 205, device rendered object selection circuitry 203, and penalty circuitry 206. The apparatus 200 may be configured to execute the operations described above with respect to FIG. 1 and below with respect to FIGS. 3-4. Although these components 201-206 are described with respect to functional limitations, it should be understood that the particular implementations necessarily include the use of particular hardware. It should also be understood that certain of these components 201-206 may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 200 may provide or supplement the functionality of particular circuitry. For example, the processor 202 may provide processing functionality, the memory 201 may provide storage functionality, the communications circuitry 205 may provide network interface functionality, and the like.

In some embodiments, the processor 202 (and/or co-processor or any other processing circuitry assisting or otherwise associated with the processor) may be in communication with the memory 201 via a bus for passing information among components of the apparatus. The memory 201 may be non-transitory and may include, for example, one or more volatile and/or non-volatile memories. In other words, for example, the memory may be an electronic storage device (e.g., a computer readable storage medium). The memory 201 may be configured to store information, data, content, applications, instructions, or the like, for enabling the apparatus to carry out various functions in accordance with example embodiments of the present disclosure.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instructions stored in the memory 201 or otherwise accessible to the processor. Alternatively, or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present disclosure while configured accordingly. Alternatively, as another example, when the processor is embodied as an executor of software instructions, the instructions may specifically configure the processor to perform the algorithms and/or operations described herein when the instructions are executed.

In some embodiments, the apparatus 200 may include input/output circuitry 204 that may, in turn, be in communication with processor 202 to provide output to the user and, in some embodiments, to receive an indication of a user input. The input/output circuitry 204 may comprise a user interface and may include a display and may comprise a web user interface, a mobile application, a client device, a kiosk, or the like. In some embodiments, the input/output circuitry 204 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 205 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 205 may include, for example, a network interface for enabling communications with a wired or wireless communication network. For example, the communications circuitry 205 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

Device rendered object selection circuitry 203 includes hardware configured to receive behavior predictions/inferences and select device rendered objects for transmission to a client device based on the predictions/inferences. The device rendered object selection circuitry 203 may utilize processing circuitry, such as the processor 202, to perform these actions. The device rendered object selection circuitry 203 may send and/or receive data from penalty circuitry 206. In some implementations, the sent and/or received data may be data associated with an inferred device rendered object interaction behavior. It should also be appreciated that, in some embodiments, the device rendered object selection circuitry 203 may include a separate processor, specially configured field programmable gate array (FPGA), or application specific interface circuit (ASIC). In some implementations, behavior inferring circuitry 206, described below, may be sub-circuitry belonging to device rendered object selection circuitry 203. The device rendered object selection circuitry 203 may be implemented using hardware components of the apparatus configured by either hardware or software for implementing the functions described herein.

Penalty circuitry 206 includes hardware configured to predict/infer device rendered object interaction behavior for one or more users associated with client profiles. The penalty circuitry 206 may utilize processing circuitry, such as the processor 202, to perform these actions. However, it should also be appreciated that, in some embodiments, the penalty circuitry 206 may include a separate processor, specially configured field programmable gate array (FPGA), or application specific interface circuit (ASIC) for performing the functions described herein. Circuitry 206 may be implemented using hardware components of the apparatus configured by either hardware or software for implementing these planned functions.

As will be appreciated, any such computer program instructions and/or other type of code may be loaded onto a computer, processor or other programmable apparatus's circuitry to produce a machine, such that the computer, processor or other programmable circuitry that execute the code on the machine create the means for implementing various functions, including those described herein.

It is also noted that all or some of the information presented by the example displays discussed herein can be based on data that is received, generated and/or maintained by one or more components of apparatus 200. In some embodiments, one or more external systems (such as a remote cloud computing and/or data storage system) may also be leveraged to provide at least some of the functionality discussed herein.

As described above and as will be appreciated based on this disclosure, embodiments of the present disclosure may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Example Processes for Inferring Device Rendered Object Interaction Behavior

FIG. 3 is an exemplary inference method 300 according to one embodiment of the present disclosure.

An exemplary method 300 begins with, for each client device of a plurality of client devices, receiving historical device rendered object interaction data associated with a client profile associated with the client device 301. In some embodiments, the historical device rendered object interaction data comprises a plurality of records.

The method 300 continues with, for each record of the plurality of records 302, extracting a device rendered object category associated with the record 303.

The method 300 continues with, for each device rendered object category extracted from the record 304, generating a penalty value 305 and generating a penalty decision 306. In embodiments, the penalty value is a programmatically generated predicted network time delay during which device rendered objects associated with the device rendered object category are not to be transmitted to the client device. In embodiments, the penalty decision is used to determine whether to apply the penalty value to future transmissions of device rendered objects to the client device. In some embodiments, the penalty value is generated using a machine learning model. In some embodiments, the penalty decision is generated using a machine learning model, e.g., a logistic regression model.

FIG. 4 is an exemplary device rendered object selection method 400 according to one embodiment of the present disclosure.

An exemplary method 400 begins, for each client device of a plurality of client devices, with retrieving a plurality of device rendered objects for transmission to the client device 401. The method 400 continues with ranking the plurality of device rendered objects for presentation on the client device 402. In embodiments, the plurality of device rendered objects is ranked according to a ranking algorithm. In embodiments, the ranking algorithm comprises one or more of a plurality of factors. Factors may include, but are not limited to, users' preferences, age group, gender, past purchases and clicks, popularity of objects, object attributes (such as price and inception date), object text title and descriptions, preference of the user for similar objects, distance between the object and the user. These factors may be used in isolation or as a combination of multiple factors. The ranking may be performed in a single stage or in several stages with each stage considering one or more factors followed by final combination of output from all the stages.

The method 400 continues with, for each device rendered object of the plurality of device rendered objects 403, extracting a device rendered object category associated with the device rendered object and retrieving a penalty decision associated with the device rendered object category 404. It will be appreciated that the penalty decision associated with the device rendered object category is specific to the client profile associated with the client device.

The method 400 continues with, based upon the penalty decision, determining whether the penalty value should be applied 405 to the device rendered object. If the penalty decision indicates that the penalty value should be applied 405, the penalty value is applied to a ranking value for the device rendered object 406.

As shown in FIG. 4 and stated above, steps 404, 405, and 406 are repeated for each device rendered object of the plurality of device rendered objects. Subsequent to each device rendered object having been subject to a penalty value, the method 400 continues with re-ranking the plurality of device rendered objects according to their ranking values 407, some of which have been adjusted according to a penalty value. The ranked plurality of device rendered objects is transmitted to the client device 408. In embodiments, the plurality of device rendered objects is arranged for display on the client device according to the ranking.

Additional Implementation Details

Although an example processing system has been described in FIG. 2, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

Conclusion

Many modifications and other embodiments of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. An apparatus for inferring repeated device rendered object interaction behavior, the apparatus comprising at least one processor and at least one memory including computer program code, the at least one memory and the computer program code configured to, with the at least one processor, cause the apparatus to:

receive historical device rendered object interaction data associated with a client device, the client device associated with a user having a user profile, the historical device rendered object interaction data comprising a plurality of records, wherein each record of the historical device rendered object interaction data is associated with a device rendered object category;

for each record of the historical device rendered object interaction data, extract the device rendered object category;

for each extracted device rendered object category,
generate a penalty value, wherein the penalty value is a programmatically generated predicted network time delay during which device rendered objects associated with the device rendered object category are not to be transmitted to the client device;
generate a penalty decision, wherein the penalty decision is used to determine whether to apply the penalty value to future transmissions of device rendered objects to the client device;

retrieve a plurality of device rendered objects selected for transmission to the client device;

rank the plurality of device rendered objects according to a ranking algorithm;

for each device rendered object of the plurality of device rendered objects,
in the event a penalty decision associated with the device rendered object category of the device rendered object indicates that its penalty value should be applied, generate a penalty adjusted ranking value by applying the penalty value to a ranking value of the device rendered object; and
re-rank the plurality of device rendered objects according to the penalty adjusted ranking value; and transmit the re-ranked plurality of device rendered objects to the client device for rendering via a display of the client device, wherein the plurality of device rendered objects is arranged for display according to the penalty adjusted ranking values of each device rendered object.

2. The apparatus of claim 1, wherein the penalty decision is generated using a logistic regression model.

3. The apparatus of claim 1, wherein the penalty value is generated using a machine learning model.

4. The apparatus of claim 1, wherein the ranking algorithm assigns a ranking value to each device rendered object of the plurality of device rendered objects based on one or more of users' preferences, the user's age group, the user's gender, the user's past purchases and clicks, popularity of objects, object attributes, object text title and descriptions, preference of the user for similar objects, distance between the object and the user.

5. The apparatus of claim 4, wherein the ranking algorithm comprises a plurality of ranking stages.

6. A system for inferring device rendered object interaction behavior, the system comprising a server in communication with a network, the server comprising at least one processor and at least one memory including computer program code, the at least one memory and the computer program code configured to, with the at least one processor, cause the server to:

receive historical device rendered object interaction data associated with a client device, the client device associated with a user having a user profile, the historical device rendered object interaction data comprising a plurality of records, wherein each record of the historical device rendered object interaction data is associated with a device rendered object category;

for each record of the historical device rendered object interaction data, extract the device rendered object category;

for each extracted device rendered object category, generate a penalty value, wherein the penalty value is a programmatically generated predicted network time delay during which device rendered objects associated with the device rendered object category are not to be transmitted to the client device;

generate a penalty decision, wherein the penalty decision is used to determine whether to apply the penalty value to future transmissions of device rendered objects to the client device;

retrieve a plurality of device rendered objects selected for transmission to the client device;

rank the plurality of device rendered objects according to a ranking algorithm;

for each device rendered object of the plurality of device rendered objects, in the event a penalty decision associated with the device rendered object category of the device rendered object indicates that its penalty value should be applied, generate a penalty adjusted ranking value by applying the penalty value to a ranking value of the device rendered object; and re-rank the plurality of device rendered objects according to the penalty adjusted ranking value; and transmit the re-ranked plurality of device rendered objects to the client device for rendering via a display of the client device, wherein the plurality of device rendered objects is arranged for display according to the penalty adjusted ranking values of each device rendered object.

7. The system of claim 6, wherein the penalty decision is generated using a logistic regression model.

8. The system of claim 6, wherein the penalty value is generated using a machine learning model.

9. The system of claim 6, wherein the ranking algorithm assigns a ranking value to each device rendered object of the plurality of device rendered objects based on one or more of users' preferences, the user's age group, the user's gender, the user's past purchases and clicks, popularity of objects, object attributes, object text title and descriptions, preference of the user for similar objects, distance between the object and the user.

10. The system of claim 9, wherein the ranking algorithm comprises a plurality of ranking stages.

11. The system of claim 9, wherein object attributes comprise price and inception date.

12. A computer-implemented method for inferring device rendered object interaction behavior, the method comprising:

receiving, using a processor, historical device rendered object interaction data associated with a client device, the client device associated with a user having a user profile, the historical device rendered object interaction data comprising a plurality of records, wherein each record of the historical device rendered object interaction data is associated with a device rendered object category;

for each record of the historical device rendered object interaction data, extract the device rendered object category;

for each device rendered object category, generating, using the processor, a penalty value, wherein the penalty value is a programmatically generated predicted network time delay during which device rendered objects associated with the device rendered object category are not to be transmitted to the client device;

generating, using the processor, a penalty decision, wherein the penalty decision is used to determine whether to apply the penalty value to future transmissions of device rendered objects to the client device;

retrieving, using the processor, a plurality of device rendered objects selected for transmission to the client device;

ranking, using the processor, the plurality of device rendered objects according to a ranking algorithm;

for each device rendered object of the plurality of device rendered objects, in the event a penalty decision associated with the device rendered object category of the device rendered object indicates that its penalty value should be applied, generate a penalty adjusted ranking value by applying the penalty value to a ranking value of the device rendered object; and re-ranking, using the processor, the plurality of device rendered objects according to the penalty adjusted ranking value; and transmitting, using the processor, the re-ranked plurality of device rendered objects to the client device for rendering via a display of the client device, wherein the plurality of device rendered objects is arranged for display according to the penalty adjusted ranking values of each device rendered object.

13. The method of claim 12, wherein the penalty decision is generated using a logistic regression model.

14. The method of claim 12, wherein the penalty value is generated using a machine learning model.

15. The method of claim 12, wherein the ranking algorithm assigns a ranking value to each device rendered object of the plurality of device rendered objects based on one or more of users' preferences, the user's age group, the user's gender, the user's past purchases and clicks, popularity of objects, object attributes, object text title and descriptions, preference of the user for similar objects, distance between the object and the user.

16. The method of claim 15, wherein the ranking algorithm comprises a plurality of ranking stages.

17. The method of claim 15, wherein object attributes comprise price and inception date.

* * * * *